June 2, 1970   J. IPPOLITO ET AL   3,515,046
PROTECTIVE INSTRUMENTATION HOUSING
Filed July 21, 1967   5 Sheets-Sheet 1
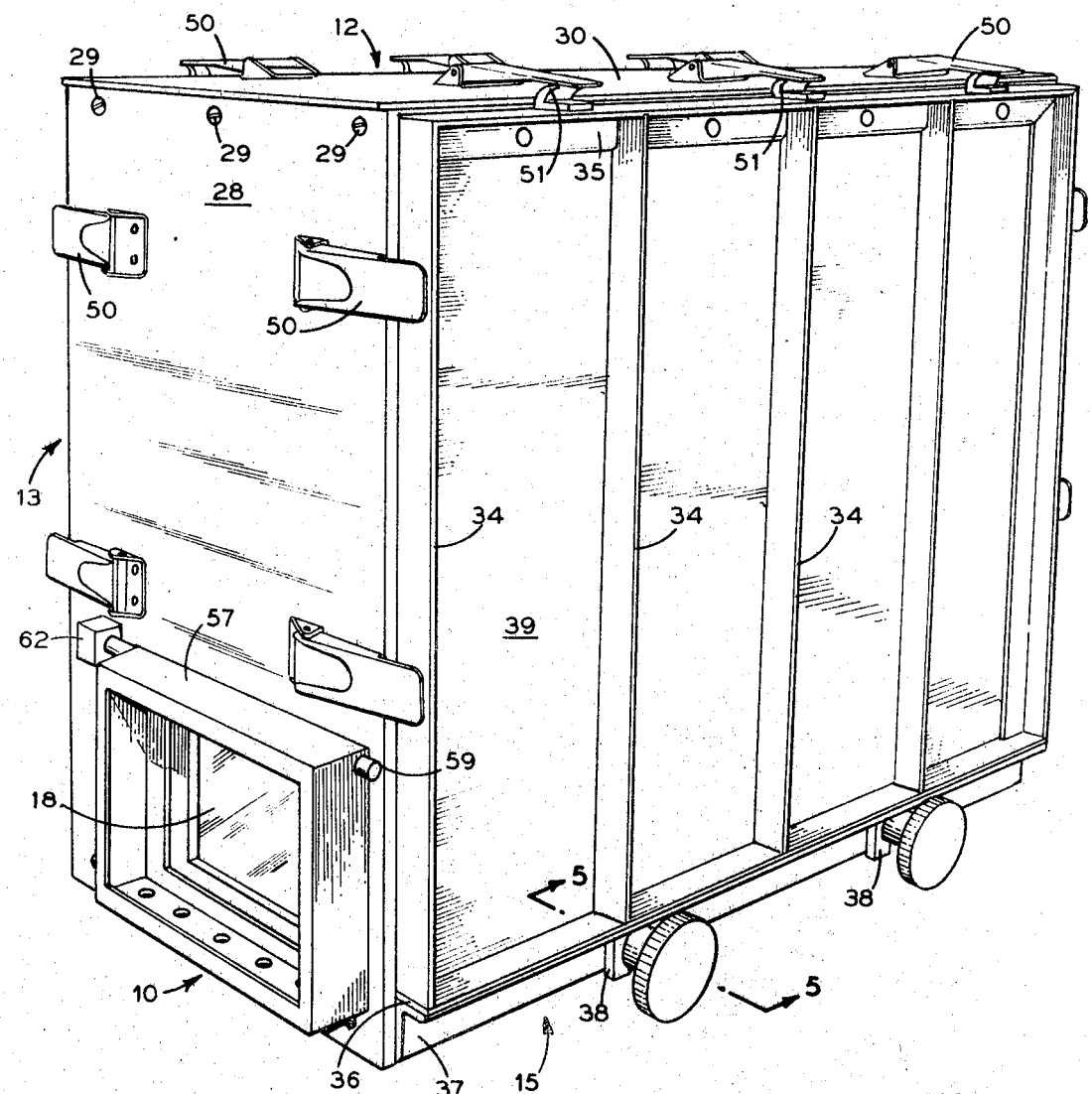
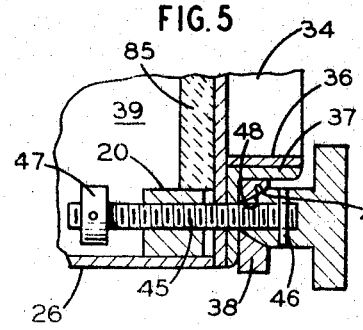
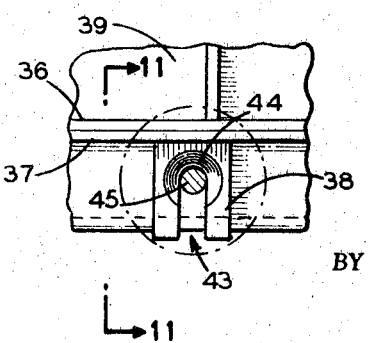
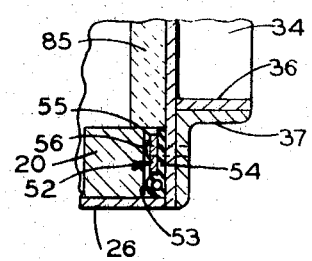
INVENTORS
James Ippolito
Aristide Ippolito
BY Philip S. Hilbert
ATTORNEY

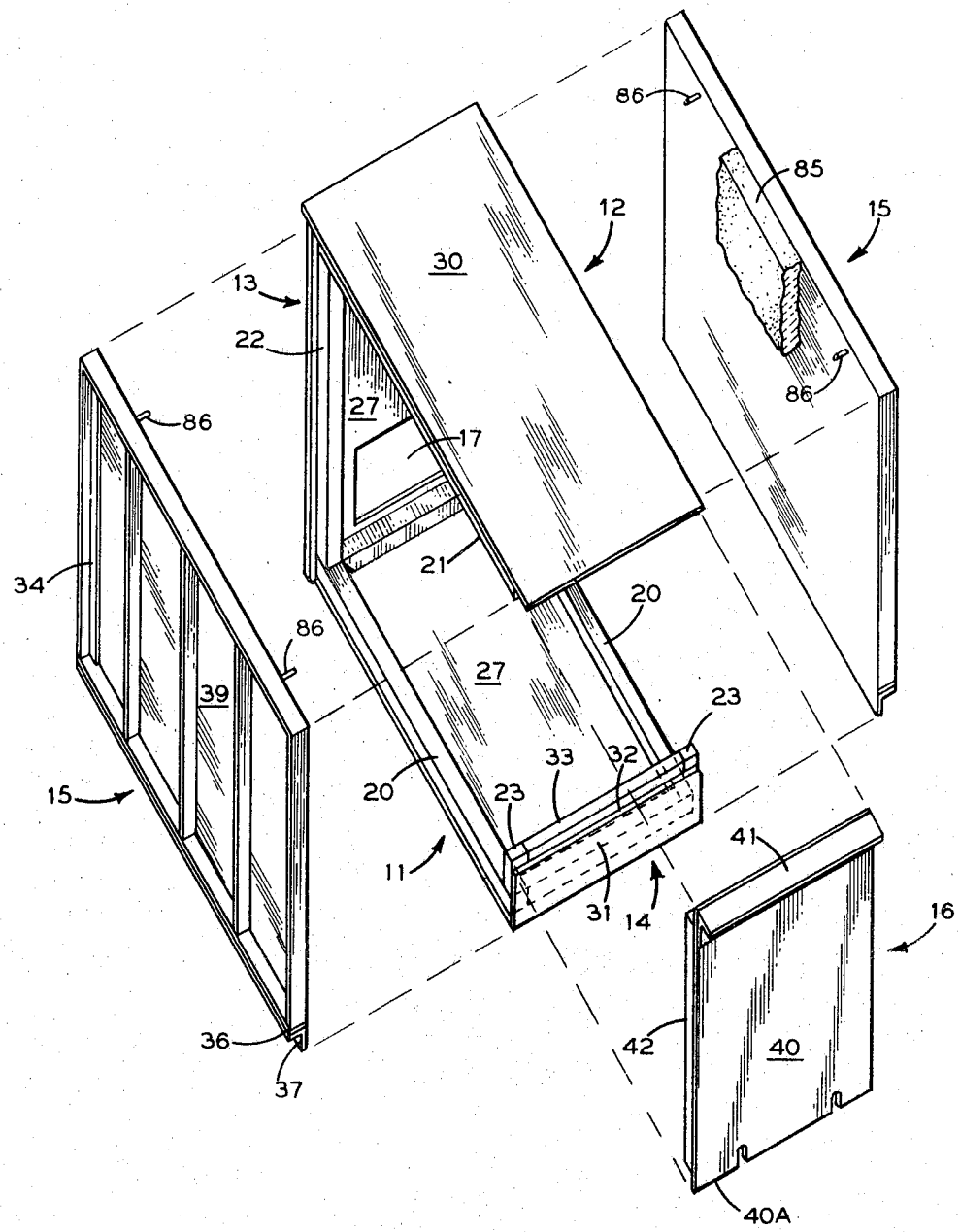

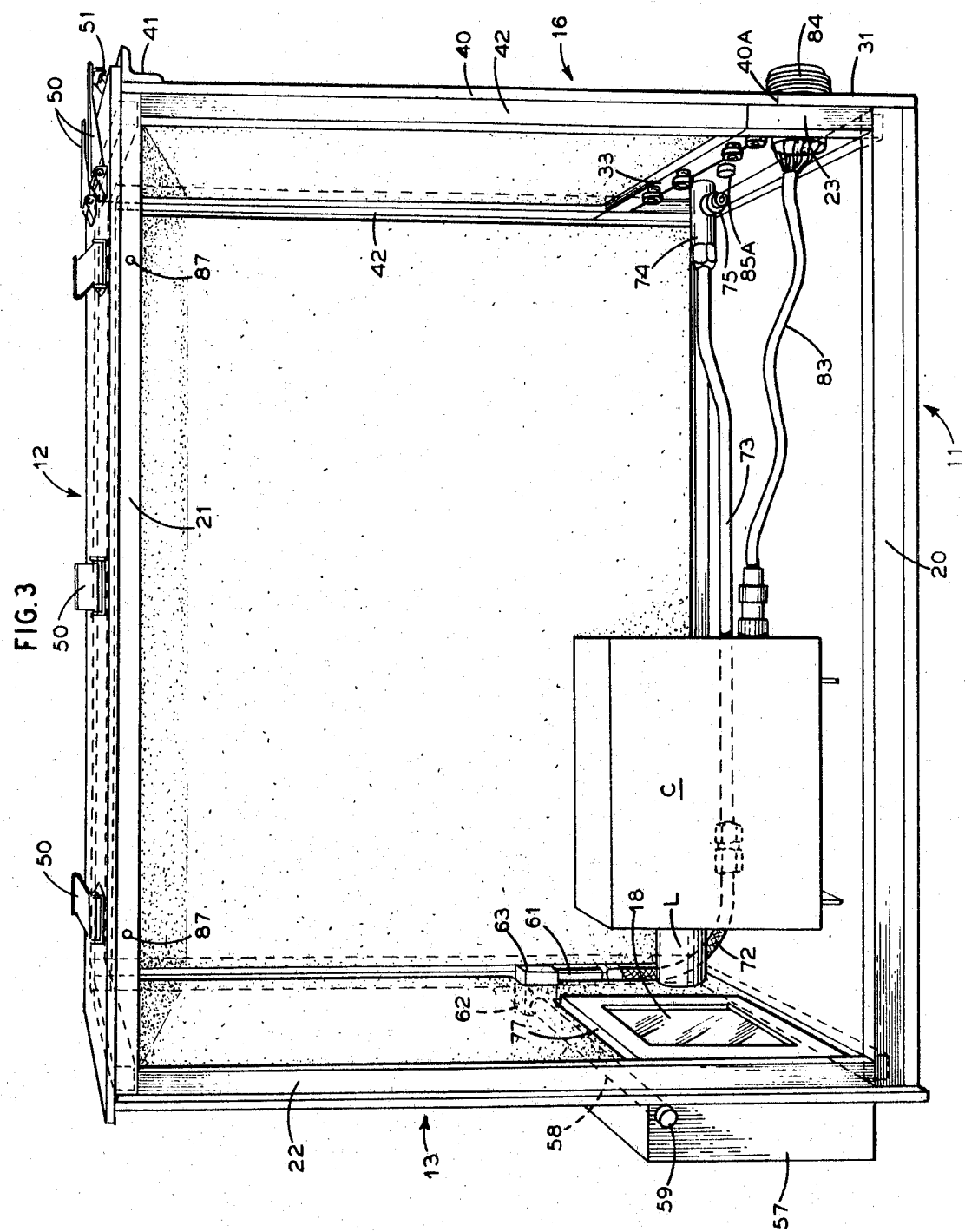

June 2, 1970  J. IPPOLITO ET AL  3,515,046
PROTECTIVE INSTRUMENTATION HOUSING
Filed July 21, 1967  5 Sheets-Sheet 5
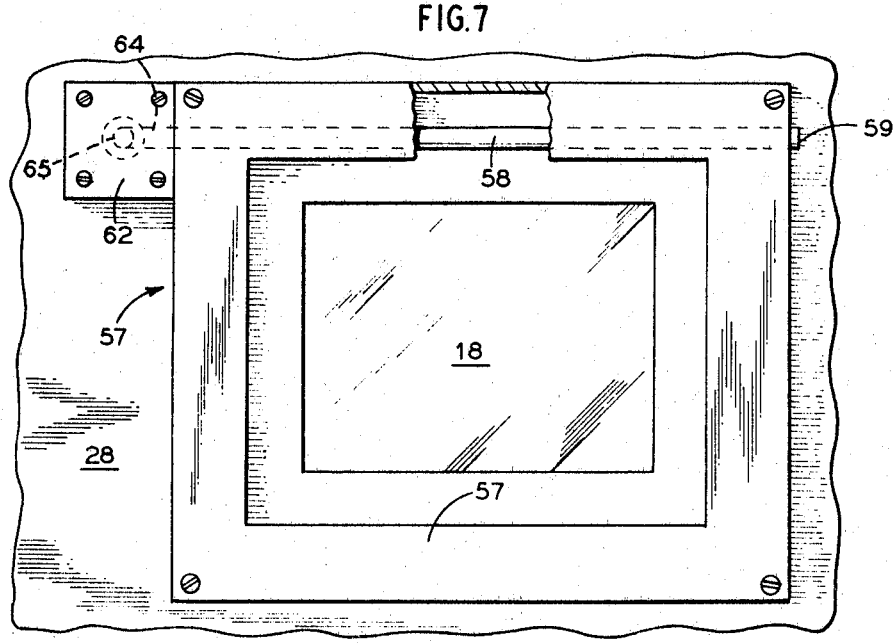
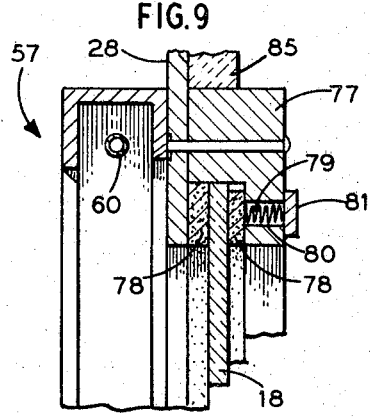
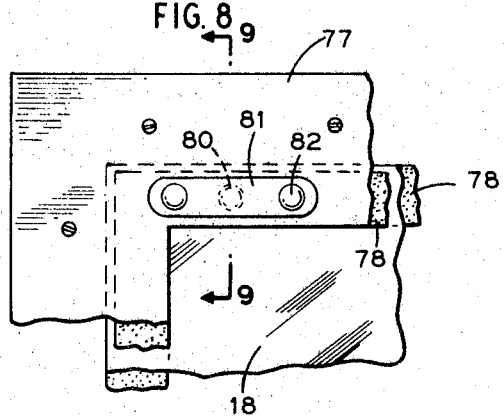
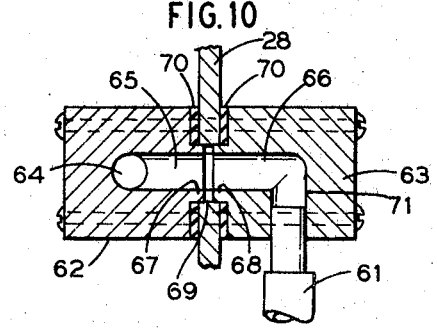

United States Patent Office 3,515,046
Patented June 2, 1970

3,515,046
PROTECTIVE INSTRUMENTATION HOUSING
James Ippolito and Aristide Ippolito, both of
1624 Stillwell Ave., Bronx, N.Y. 10461
Filed July 21, 1967, Ser. No. 655,105
Int. Cl. G03b 17/08
U.S. Cl. 95—11                              9 Claims

ABSTRACT OF THE DISCLOSURE

A housing construction for sensitive instrumentation such as photographic cameras or the like to protect the same against extreme environmental conditions including very high temperatures, cooling water, steam, deleterious gases and the like; together with structural features providing for ready accessibility to the interior thereof.

BACKGROUND OF THE INVENTION

In observing the performance of certain equipment which produces very high temperature flame phenomena, such as rocket motors, missiles and the like, photographic recording of the flame patterns for subsequent examination, is quite common. Obviously, the environment of such phenomena is distinguished by very high temperatures and further includes protective water showers, steam and various gases; all of which could adversely affect the observing and recording instrumentation.

It follows that the cameras or the like, are housed for suitable protection against such adverse conditions; particularly as the cameras are usually located quite close to the flame phenomena under observation. Accordingly, an object of this invention is to provide improved housing for cameras or the like which is of compact construction, minimum weight, readily fabricated, economical to produce and easily manipulated in use.

Frequently, the camera housing is located immediately adjacent other equipment, supporting structure and the like, which creates a problem of accessibility in respect to the housing in order to insert or remove the camera, to remove exposed film and replace with new film, and to repair or adjust the equipment. Therefore, a further object of this invention is to provide a housing of the character described, which includes detachable wall panels, thus allowing for access to the interior of the housing from various portions of the perimeter of the housing.

Still another object of this invention is to provide in a housing of the character described, which includes a window portion and improved means for supplying a gas flow which will keep the window portion clear of the water or other fluid showers to which the housing is normally subjected to. Such gas flow is further adapted to provide a pressurized condition within the housing to prevent ingress of water, steam or deleterious gases into the interior of the housing.

Yet another object of this invention is to provide an improved housing of the character described, which may be utilized under pressurized conditions, and having a construction adapted to yield to excess pressures so as to normalize pressures within the housing and thereby protect the housed equipment against possible damage.

Other objects of this invention will in part be obvious and in part hereinafter pointed out.

SUMMARY OF THE INVENTION

The housing of the instant invention, comprises essentially a combination of fixed and removable wall panels which provides for ready access to the interior thereof from either side or the back thereof; the wall panels being of a construction which provides maximum protection against high temperatures, water, steam and gases, together with gas pressure means for pressurizing the interior of the housing and also providing means for wiping shower water from a window portion of the housing.

BRIEF DESCRIPTION OF THE DRAWINGS

FIG. 1 is a perspective view showing the housing of the instant invention;
FIG. 2 is an exploded perspective view showing the panel assembly of the housing;
FIG. 3 is a side elevational view showing the interior of the housing;
FIG. 5 is a sectional view taken on the line 5—5 of FIG. 1;
FIG. 6 is a front elevational view thereof with the bolt removed;
FIG. 7 is a front elevational view, with parts broken away and parts in section, showing the window portion thereof;
FIG. 8 is a partial elevational view showing the interior window frame;
FIG. 9 is a sectional view taken on the line 9—9 of FIG. 8;
FIG. 10 is a sectional view showing the coupling details of the pass through portion of the gas line;
FIG. 11 is a sectional view taken on the line 11—11 of FIG. 6.

PREFERRED EMBODIMENT OF THE INVENTION

Figure 4:
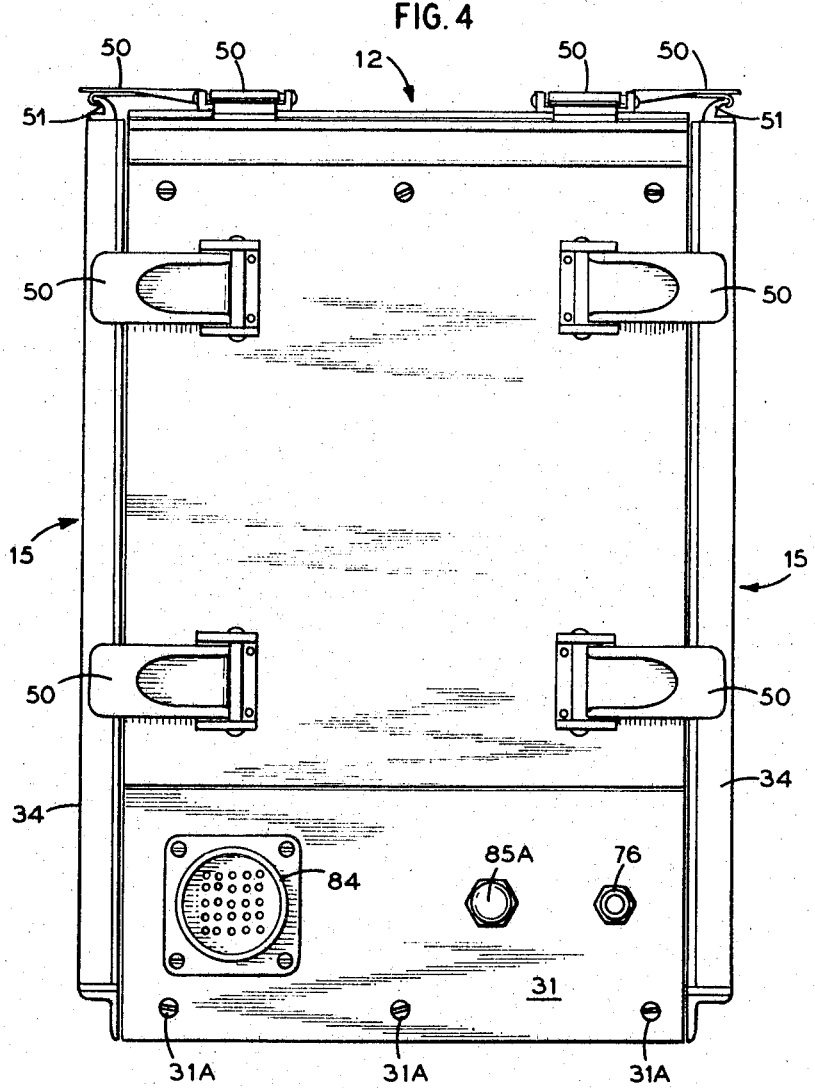
FIG. 4 is a rear elevational view thereof.

As shown in the drawings, 10 designates a housing embodying the invention, for containing and protecting a sensitive device such as a camera indicated at C. The same is of rectangular shape including a bottom wall 11, a top wall 12, a front wall 13 interconnecting the top and bottom walls; and a partial back wall portion 14 fixed to bottom wall 11 and upstanding therefrom.

The housing 10 further includes a pair of side wall panels generally indicated at 15 which are removably mounted relative to the top wall 12, front wall 13 and bottom wall 11; and a back wall panel 16 which is removably mounted on the fixed back wall portion 14 and connected to the rear edge portions of top wall 12 and side wall panels 15.

The housing 10 is particularly adapted to contain camera C which is removably mounted on bottom wall 11, by suitable means not shown; its lens mounting portion L being aimed at front wall 13 which is formed with a rectangular opening 17 in which a window 18 is mounted, as later described in detail.

The walls and panels forming housing 10 are related to a frame work comprising bottom side bars 20, top side bars 21, vertical front bars 22 interconnecting bars 20, 21 and short vertical back bars 23 upstanding from the rear portions of bottom side bars 20. Cross bars 24, 25 extend between the forward ends of side bars 20, 21 respectively and a cross bar 26 extends between the rear ends of side bars 20. The bars forming such framework are joined at their juncture points by welding or the like.

The bottom wall 11 comprises a metal plate 27 screwed to the bars 20, 24 and 26. Front wall 13 comprises a plate 28 screwed to the cross bars 24, 25 as at 29. Top wall 12 comprises a plate 30 welded to bars 21 and 25. The back wall portion 14 comprises a plate 31 screwed to the rear cross bar 26, as at 31A the top edge 32 of plate 31 is located somewhat below the top ends of frame bars 23. A flat abutment plate 33 extends transversely between the upper portions of bars 23 and is secured thereto, for the purpose hereinafter appearing.

The side wall panels 15 comprise a framework made up of vertical angle members 34 interconnected by a top angle member 35 and a bottom strip 36. An apron angle member 37 is welded to strip 36. Spaced abutment blocks 38 are welded to outer surface portions of apron member 37, for the purpose later described. A panel plate 39 spans frame members 34, 35, 36 and is welded thereto.

The removable back wall panel 16 comprises a plate 40 having an angle member 41 secured to the top edge thereof and on the outer surface thereof; and vertical bars 42 secured to the side edges on the inner surface thereof; the lower ends of bars 42 terminating short of the bottom edge 40A of plate 40. Thus, with panel 16 in place, bars 42 will align with bars 23 and the lower portion of plate 40 will overlap abutment plate 33.

Means is provided for detachably connecting side wall panels 15 to top wall 12, front wall 13 and bottom wall 11. To this end, the bottom edge portion of the panels are formed with downwardly opening slots 43 which extend through abutment blocks 38. The upper ends of slots 43 are countersunk to form conically shaped recesses 44. Screws 45 with knobbed heads 46 pass through slots 43 and are received in threaded through openings in frame bars 20 with lock nuts 47 affixed to the outer ends thereof to prevent separation of said screws 45 from the bars 20.

Screws 45 have a tapered, conical shaped collar portion 48 which is received in recesses 44 to securely lock panels 15 in place. Pivoted latch members 50 are secured to outer surface portions of top plate 30 and front plate 28; said members having conventional hooked ends which are adapted to engage lipped keeper members 51 secured to panel frame members 34, 35. Thus, panels 15 may be quickly locked in place through suitable manipulation of latch members 50 and screws 45, and also quickly disconnected for gaining access to the interior of housing 10 from either side thereof.

A tight seal for panels 15 is provided by means of gasketting 52 which has a tubular portion 53 and an attaching flange portion 54 projecting from portion 53. A peripheral strip 55 overlies flange portion and screws 56 secures the same in place with respect to peripheral edge portions of plate 39; the gasket portions 53 bearing against frame bars 20, 21, 22, 23 and panel bars 42.

The back wall panel 16 is also arranged for detachable connection to top panel 30, bottom wall plate 31 and interconnection to side panels 15. To this end, the bottom edge portion of plate 40 is formed with downwardly opening slots 43 similar to those previously described and having conical recesses 44 for receiving lock screws 45 which pass through slots 43 and threaded openings in abutment plate 33. Latch members 50 on top panel 30 at the rear edge thereof, engage hooked keeper members 51 fixed to angle member 41 on back plate 40; while similar latch members 50 secured to side marginal portions of back plate 40 are adapted to engage keeper members 51 fixed to the rearmost frame member 34 of side panels 15.

Inasmuch as housing 10 and its contained camera C is usually subjected to heavy water showers to protect the same against high temperatures of the environmental surroundings, means is provided for effectively wiping the outer surface of window 18. To this end, a rectangular frame 57 of channel cross section, is affixed to the outer surface of front plate 28 and frames opening 17 therein. A gas conduit tube 58 is positioned within the top portion of frame 57, the closed end 59 thereof projecting through an opening in the right hand portion of frame 57, looking at FIG. 7.

Tube 58 is formed with spaced apertures 60 along the length thereof, which are located to direct air or other gas under pressure, toward the outer surface of window 18.

The other end of tube 58 projects through the other side of frame 57 for connection to a supply line 61 located interiorly of housing 10, by way of a pair of connector blocks 62, 63 located on opposite sides of plate 28, respectively. The outer connector block 62 is formed with a lateral passage 64 for receiving at its outer end the left hand end of tube 58, looking at FIG. 7. Passage 64 communicates with a passage 65 at right angles thereto and opening on the inner surface of block 62.

Similarly, block 63 is formed with a passage 66 which aligns with passage 64 in block 62, when said blocks are affixed to the opposite sides of front plate 28, with annular projections 67, 68 on the inner surfaces of said blocks projecting into an opening 69 in plate 28. Annular gaskets 70 about projections 67, 68 seal the blocks 62, 63 in place. Block 63 further includes a passage 71 communicating with passage 66 and at right angles thereto, for receiving the terminal end of gas supply line 61.

The other end of supply line 61 is connected to a right angle conduit portion 72 which in turn is connected to a line 73 extending along the bottom panel 11. The line 73 at a point adjacent back panel portion 14 has a T connector 74 connected thereto, with a bleeder valve 75 in one leg of connector 74 for supplying the interior of housing 10 with air under selected pressure. The other leg of connector 74 passes through wall portion 14 for connection to an inlet nipple 76 projecting outwardly thereof, for connection to a source of air under pressure, not shown.

The window 18 is resiliently mounted in opening 17 in front plate 28. To this end, there is provided a rectangular frame member 77 which is of angular section and is affixed to the inner surface of said plate 28 about opening 17 therein. The peripheral edge portions of window 18 are received in the peripheral recess provided by frame member 77; gaskets 78 on opposite marginal edges of the window 18 are also received in said frame recess.

Spiral springs 79 are disposed in through openings 80 formed in the corner portions of frame member 77, with their inner ends bearing on corner portions of the inner gasket 78. Keepers 81 cover the openings 80 and retain springs 79 in place; said keepers 81 being removably held in place by screws 82.

As camera C is electrically operated, cable means 83 extending from the rear of said camera C, is connected to a multiterminal electric connector block 84 which is sealed into an opening provided in back wall portion 14, thereby allowing current to be supplied via said block 84 for operating camera C. Also, a safety valve 85A is sealed into back wall portion 14, which becomes operative in the event of excessive interior pressures, to reduce said interior pressures to safe values.

It will be apparent, that a predetermined pressure may be maintained within housing 10 by means of bleeder valve 75 to thereby repel the ingress of water, water vapor, steam or harmful gases, into said housing. Further, latch members 50 while securing the several wall panels in tightly sealed relation; are still adapted to yield slightly in response to pressures within the housing which reach certain levels, so as to leak sufficient air in order to reduce excessive pressure values.

The interior surfaces of the housing panels may have sheets 85 of suitable thermal insulation secured thereto, to provide further protection for the content of housing 10. Also, the tubular portions 53 of gasketting 52 may have openings therein at selected points along the length thereof, to admit pressurized air therein and to maintain the gasketting in effective sealing relation to opposed housing portions.

The plates forming the walls of housing 10 may be formed of aluminum or other lightweight alloys, to materially reduce the overall weight of the housing. The bottom channel portions of frame 57 may be formed with drain openings, not shown, to allow for drainage of any collected cooling water.

While housing 10 is shown as encasing a camera, it is understood that such housing may also be used to protect other delicate and sensitive instruments or devices, with suitable modification of the walls to provide for appropriate inputs and outputs in accordance with the nature of the instruments or devices.

The side wall panels 15 and back wall panel 16 may be provided with alignment pins 86 which project from the top edges thereof and inner sides thereof for reception in openings 87 formed in opposed frame portions of the housing. Pins 86 also lock the panels 15, 16 against vertical displacement under extreme pressure conditions.

We claim:

1. A protective housing for electrically operated camera means, said housing comprising a bottom wall, a top wall, a front wall, a pair of side wall panels, a lower back wall portion and an upper back wall portion, the bottom edge of the upper back wall portion abutting the top edge of the lower back wall portion, current supply connector means on said lower back wall portion for connection to said camera means, for fixedly connecting the top edge of the front wall to the forward edge of the top wall, means for fixedly connecting the bottom edge of the front wall to the forward edge of the bottom wall, means for fixedly connecting the bottom edge of the lower back wall portion to the rear edge of said bottom wall, means for detachably connecting the peripheral edge portions of said side wall panels to corresponding edge portions of said front, top and bottom walls, and means for detachably connecting side and top edge portions of said upper back wall portion to corresponding edge portions of said top wall and said side wall panels, said side wall panels and said upper back wall portion being selectively removable to provide access to selected portions of the perimeter of the housing.

2. A housing as in claim 1, wherein said front wall includes window means for alignment with the lens mounting portion of said camera means, said camera means being electrically operable, and electric terminal means mounted on said lower back wall portion for connection to said camera means.

3. A housing as in claim 1 wherein said detachable connecting means includes downwardly opening slot means formed on bottom edge portions of said side wall panels and said upper back wall portion, said slot means including conical recess portions on the outer faces thereof, screw means passing through said slot means and threaded into fixed portions of said housing, said screw means including conical collar portions receivable in said conical recess portions of the slot means.

4. A housing as in claim 1 wherein said front wall is formed with an opening, window means mounted in said opening, and means for directing a flow of gas over the outer surface of said window means.

5. A housing as in claim 4, said last mentioned means including gas conduit means located within said housing, perforated gas conduit means located on said front wall on the outer surface thereof above said window means, means coupling said first and second mentioned conduit means, gas input means on said first back wall portion connected to said first mentioned gas conduit means; and valve means on said first mentioned gas conduit means for allowing the escape of gas into the interior of said housing to maintain predetermined pressure conditions within said housing.

6. A housing as in claim 4, and means for resiliently mounting said window means in the opening in said front wall.

7. A housing as in claim 1 wherein said detachable connecting means includes pivoted latch means on said front and top walls, and keeper means on said side wall panels engageable by said latch means.

8. A housing as in claim 1 wherein said second mentioned detachable connecting means comprises coacting latch means and keeper means mounted on adjacent portions of said side wall panels and said upper back wall portion.

9. A housing as in claim 5 wherein said conduit coupling means comprises a pair of conduit members respectively affixed to opposite sides of said front wall, said front wall being formed with an opening in communicating relation with conduit portions of each of said pair of conduit members, the inlet end of said perforated gas conduit means being connected with a conduit portion of the conduit member on the outer surface of said front wall, and the outlet end of the gas conduit means within said housing being connected with a conduit portion of the conduit member on the inner surface of said front wall.

References Cited

UNITED STATES PATENTS

| | | | |
|---|---|---|---|
| 1,956,628 | 5/1934 | Rutishauser | 52—171 X |
| 2,265,618 | 12/1941 | Adams | 220—4 |
| 2,919,826 | 1/1960 | Richter | 220—4X |

NORTON ANSHER, Primary Examiner

A. MATHEWS, Assistant Examiner

U.S. Cl. X.R.

52—171; 312—20; 220—82, 4; 352—242